United States Patent
Farooq et al.

(10) Patent No.: US 10,640,066 B1
(45) Date of Patent: May 5, 2020

(54) VEHICLE ENERGY ABSORBER

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Ching-Hung Chuang, Northville, MI (US); Srinivasan Sundararajan, Ann Arbor, MI (US); Ninad Trifale, Farmington Hills, MI (US); Nirmal Muralidharan, Birmingham, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/166,554

(22) Filed: Oct. 22, 2018

(51) Int. Cl.
*B60R 19/18* (2006.01)
*B60R 19/04* (2006.01)
*B60R 21/34* (2011.01)
*B60R 19/03* (2006.01)

(52) U.S. Cl.
CPC .............. *B60R 19/18* (2013.01); *B60R 19/03* (2013.01); *B60R 19/04* (2013.01); *B60R 21/34* (2013.01); *B60R 2019/1806* (2013.01); *B60R 2019/186* (2013.01); *B60R 2019/1893* (2013.01)

(58) Field of Classification Search
CPC ......... B60R 19/18; B60R 19/03; B60R 21/34; B60R 19/04
USPC ........................................................ 293/133
See application file for complete search history.

(56) References Cited

U.S. PATENT DOCUMENTS

| | | | |
|---|---|---|---|
| 3,995,901 A | 12/1976 | Filbert, Jr. et al. | |
| 5,033,593 A * | 7/1991 | Kazuhito | B60J 5/0443 188/377 |
| 5,340,178 A * | 8/1994 | Stewart | B60R 19/18 293/122 |
| 6,290,272 B1 | 9/2001 | Braun | |
| 7,565,746 B2 | 7/2009 | Yeh | |
| 9,827,933 B1 | 11/2017 | Cheng et al. | |
| 10,000,171 B2 | 6/2018 | Pingston et al. | |
| 10,005,408 B2 | 6/2018 | Bobba et al. | |
| 10,046,723 B1 | 8/2018 | Faruque et al. | |
| 2010/0109353 A1 | 5/2010 | Allen et al. | |
| 2011/0204663 A1* | 8/2011 | Baccouche | B60R 19/18 293/102 |

(Continued)

FOREIGN PATENT DOCUMENTS

| CN | 101844550 B | 2/2012 |
|---|---|---|
| CN | 207089212 U | 3/2018 |

OTHER PUBLICATIONS

Non-Final Office Action dated Sep. 3, 2019 re U.S. Appl. No. 15/948,175, filed Apr. 9, 2018.

(Continued)

*Primary Examiner* — Jason S Morrow
(74) *Attorney, Agent, or Firm* — Frank A. MacKenzie; Bejin Bieneman PLC

(57) ABSTRACT

A bumper assembly includes a bumper beam and a fin supported by the bumper beam. The fin extends along an axis from a proximate end proximate to the bumper beam to a distal end distal to the bumper beam. The fin has a sinuous cross section and a thickness each normal to the axis. The thickness at the distal end is less than the thickness at the proximate end.

20 Claims, 7 Drawing Sheets

(56) References Cited

U.S. PATENT DOCUMENTS

| | | | |
|---|---|---|---|
| 2013/0001964 A1* | 1/2013 | Freundl | B60R 19/18 |
| | | | 293/133 |
| 2013/0175128 A1 | 7/2013 | Kumar et al. | |
| 2017/0036624 A1* | 2/2017 | Yabu | B60R 19/03 |
| 2017/0203708 A1* | 7/2017 | Jaradi | B60R 19/18 |
| 2017/0334381 A1 | 11/2017 | Cheng et al. | |
| 2017/0355332 A1 | 12/2017 | Pingston et al. | |
| 2017/0369013 A1 | 12/2017 | Muralidharan et al. | |
| 2018/0244222 A1 | 8/2018 | Nusier et al. | |

OTHER PUBLICATIONS

Fuhao Mo, et. al., "Design of a Conceptual Bumper Energy Absorber Coupling Pedestrian Safety and Low-Speed Impact Requirements", Applied Bionics and Biomechanics, vol. 2018, Article ID 9293454, retrieved from Internet URL: https://doi.org/10.1155/2018/9293454 (9 pages).

* cited by examiner

VEHICLE ENERGY ABSORBER

BACKGROUND

Vehicle bumpers may have a stiffness determined by the material and structure of the bumper. However, the desired stiffness of the bumper may be different depending on vehicle speed. For example, at a low vehicle speed, a higher stiffness may be desired to prevent damage to the bumper, while at a high vehicle speed, a lower stiffness may be desired to absorb energy during a pedestrian or vehicle impact.

Several organizations release test protocols and standards for vehicles directed to specific outcomes. For example, the Research Council for Automobile Repairs (RCAR) releases impact test protocols and standards for vehicles. One example RCAR impact test protocol is directed toward low speed damageability (LSD), i.e., damage to vehicle components at 15 kilometers per hour (kph). In another example, the National Highway Traffic Safety Administration (NHTSA) releases the Federal Motor Vehicle Safety Standards (FMVSS) Part 521, which describes impact test protocols for LSD of vehicle bumper systems. However, as described above, the stiffness of the bumper system for LSD may differ from the stiffness desired for pedestrian protection. For example, the European New Car Assessment Programme (EURO NCAP) protocols for lower leg impact at 40 kph may be benefited by a lower stiffness for the bumper in comparison to the stiffness desired for FMVSS protocols for LSD. In other words, requirements for LSD and pedestrian protection may create competing design principles. There remains an opportunity to design a vehicle bumper that accounts for low speed damageability and pedestrian impact.

DETAILED DESCRIPTION

Figure 1:
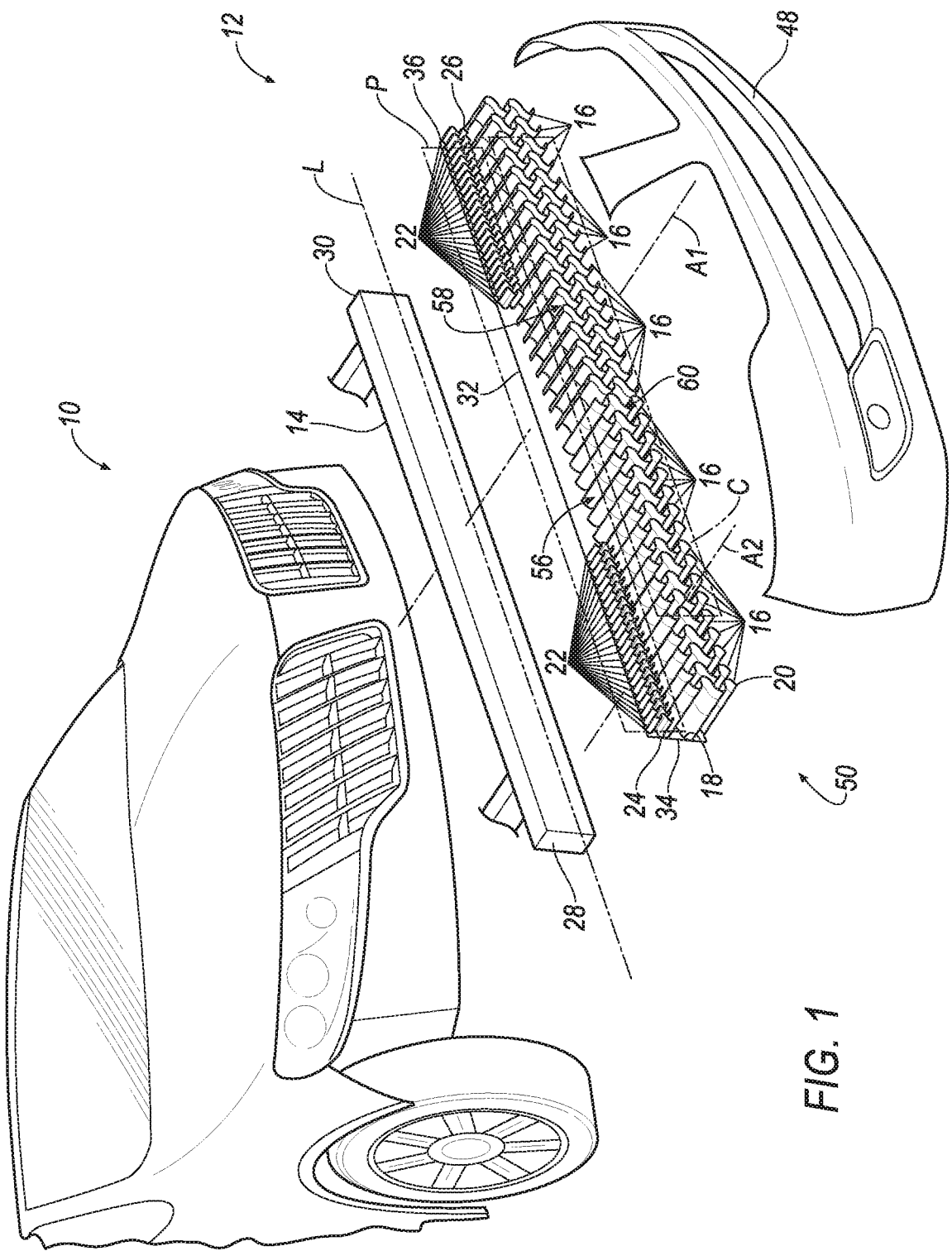
FIG. 1 is an exploded view of a vehicle with a bumper assembly.

A bumper assembly includes a bumper beam and a fin supported by the bumper beam. The fin extends along an axis from a proximate end proximate to the bumper beam to a distal end distal to the bumper beam. The fin has a sinuous cross section and a thickness each normal to the axis. The thickness at the distal end is less than the thickness at the proximate end.

The fin may include a plurality of segments disposed along the axis from the proximate end to the distal end. The thickness of each segment decreases relatively along the axis from the proximate end to the distal end.

The bumper assembly may include a plurality of fins. The plurality of fins may include the fin. Each of the plurality of fins may be supported by the bumper beam and each may extend along an axis from a proximate end proximate to the bumper beam to a distal end distal to the bumper beam. Each fin may have a sinuous cross section and a thickness each normal to the respective axis. The thickness at the distal end may be less than the thickness at the proximate end.

Each of the fins may include a plurality of segments disposed along the axis from the proximate end to the distal end. The thickness of each segment may decrease relatively along the axis from the proximate end to the distal end.

The fins may be spaced along the bumper beam in a cross-vehicle direction.

The bumper assembly may include a plate supported by the bumper beam. The fins may be supported by the plate.

The plate may extend in a cross-vehicle direction from a first end to a second end and includes a center between the first and second ends. The fins may include a first fin attached to the plate between the first end and the center and a second fin attached to the plate between the center and the second end. The first fin may have a different orientation that the second fin.

The bumper assembly may include a fascia. The fin is disposed between the bumper beam and the fascia.

A bumper assembly includes a bumper beam, a fin, and a secondary fin each supported by the bumper beam and extending along an axis from a proximate end to a distal end. The fin has a sinuous cross section normal to the respective axis. The distal end of the secondary fin is disposed between the bumper beam and the distal end of the fin.

The secondary fin may have a sinuous cross section.

The secondary fin may be stiffer than the fin.

The fin may include a plurality of segments disposed along the axis from the proximate end to the distal end. The thickness of each segment decreases relatively along the axis from the proximate end to the distal end.

The bumper assembly may include a plurality of fins. The plurality of fins may include the fin. Each of the plurality of fins may be supported by the bumper beam and each may extend along an axis from a proximate end proximate to the bumper beam to a distal end distal to the bumper beam. Each fin may have a sinuous cross section and a thickness each normal to the respective axis. Each fin may have a plurality of segments disposed along the respective axis from the respective proximate end to the respective distal end, the thickness of each segment decreases relatively along the respective axis from the respective proximate end to the respective distal end.

The bumper assembly may include a plurality of secondary fins. The plurality of secondary fins may include the secondary fin. Each of the plurality of secondary fins may be supported by the bumper beam and each may extend along an axis from a proximate end to a distal end. The distal ends of the secondary fins may be disposed between the bumper beam and the distal ends of the fins.

The distal ends of the fins each may present a flat surface. The flat surfaces of the fins may define a plane, and each fin may have a sinuous cross section in the plane.

The distal ends of the secondary fins each may present a flat surface. The flat surfaces of the secondary fins may define a second plane parallel to the plane.

Each secondary fin may have a sinuous cross section in the second plane.

The bumper assembly may include a plate supported by the bumper beam. The fin and the secondary fin may be supported by the plate.

The plate may extend from a top to a bottom in a direction transverse to a cross-vehicle direction. The fin may be disposed adjacent to one of the top and the bottom of the plate, and the secondary fin may be disposed adjacent to the other of the top and the bottom of the plate.

The bumper assembly may include a fascia. The fascia may cover the fin and the secondary fin.

With reference to the Figures, wherein like numerals indicate like parts throughout the several views, a vehicle 10 is generally shown. The vehicle 10 includes a bumper assembly 12 having a bumper beam 14 and a fin 16 supported by the bumper beam 14. The fin 16 extends along an axis A1 from a proximate end 18 proximate to the bumper beam 14 to a distal end 20 distal to the bumper beam 14. The fin 16 has a sinuous cross section and a thickness both taken in a plane normal to the axis A1. The thickness at the distal end 20 is less than the thickness at the proximate end 18.

Additionally, the bumper assembly 12 includes a secondary fin 22 supported by the bumper beam 14. The secondary fin 22 extends along an axis A2 from a proximate end 24 proximate the bumper beam 14 to a distal end 26 distal to the bumper beam 14. The distal end 26 of the secondary fin 22 is disposed between the bumper beam 14 and the distal end 20 of the fin 16.

The fin 16 may absorb energy from an object during an impact, deforming toward the bumper beam 14. By absorbing energy from the object, the fin 16 may satisfy low speed damageability (LSD) test protocols and pedestrian protection test protocols. For example, the fin 16 may have a lower stiffness at the distal end 20 relative to the proximate end 18, i.e., the distal end 20 may be softer than the proximate end 18. In other words, the stiffness of the fin 16 may decrease along the axis A1 from the proximate end 18 to the distal end 20. The decreasing stiffness of the fin 16 along the axis A1 from the proximate end 18 to the distal end 20 provides specific deformation characteristics for the fin 16 to absorb energy from the object. For example, the decreasing relative stiffness along the axis A1 may allow axial deformation, e.g., bending, crushing, etc., when absorbing energy from the object, which may allow deformation at the distal end 20 and resist deformation at the proximate end 18. Furthermore, the sinuous shape provides specific deformation characteristics for the fin 16 to absorb energy from the object. For example, the sinuous shape may provide axial deformation characteristics when absorbing energy from the object, which may resist deformation at low speeds and may allow deformation at high speeds. Thus, the fin 16 with the sinuous shape may have a high stiffness during a low speed impact and a low stiffness during a high-speed impact.

The secondary fin 22 may absorb energy from the object during the impact, deforming toward the bumper beam 14. By absorbing energy from the object, the secondary fin 22 may satisfy low speed damageability (LSD) test protocols. The secondary fin 22 may have a uniform stiffness along the axis A2 from the proximate end 24 to the distal end 26. The uniform thickness provides specific deformation characteristics for the secondary fin 22 to absorb energy from the object. For example, the uniform thickness may resist axial deformation, e.g., bending, crushing, etc., as compared to the fin 16. In other words, the secondary fin 22 may have a higher relative stiffness than the fin 16 to prevent the object from impacting, i.e., bottoming out against, the bumper beam 14 during the impact.

Figure 4B:
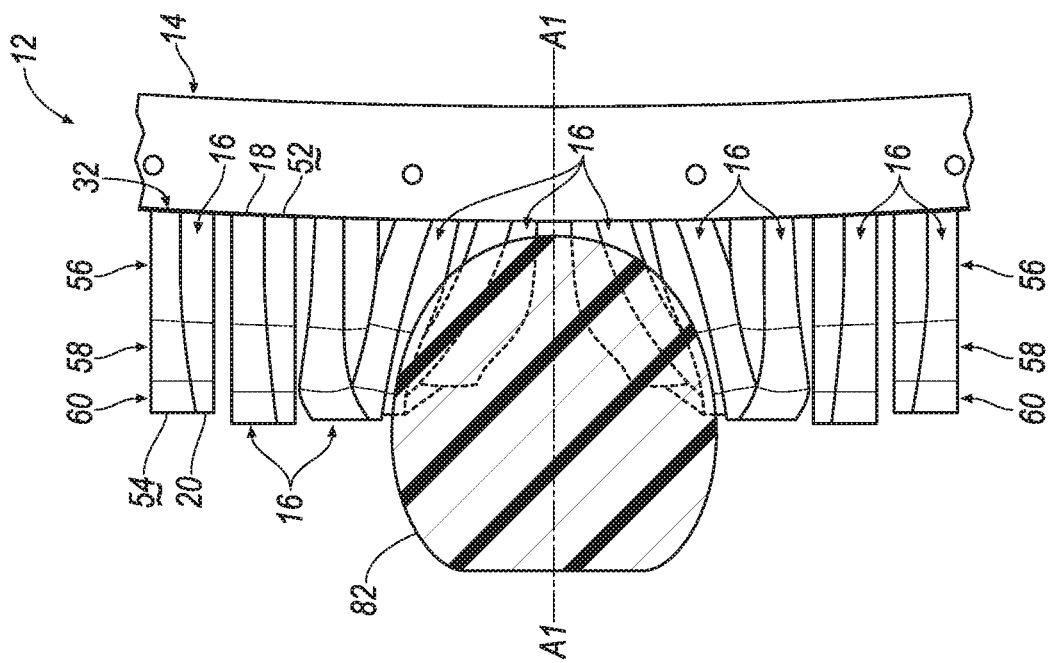
FIGS. 4A-4B illustrate the bumper assembly impacting an object.

As shown in FIG. 1, the vehicle 10 includes the bumper assembly 12. The bumper assembly 12 may absorb energy during the impact. The bumper assembly 12 includes the bumper beam 14, a plurality of fins 16, and a plurality of secondary fins 22. The fins 16 and the secondary fins 22 are supported by the bumper beam 14, as shown in FIGS. 1-2 and 4A-5C. The fins 16 and the secondary fins 22 may absorb energy from the impact. The impact may be a dual stage impact, i.e., the impact may include a first stage and a second stage. For example, during the first stage of the impact, an object may contact the fins 16, as shown in FIGS. 4B and 5B, deforming the fins 16. The object may, for example, be spaced from the secondary fins 22 during the first stage impact. In other words, the fins 16 may prevent the object from intruding to the secondary fins 22. During the second stage of the impact, the object may contact the secondary fins 22, as shown in FIG. 5C, deforming the secondary fins 22. In other words, the object may deform the fins 16 and continue to intrude along the axis A1 to impact the secondary fins 22.

With continued reference to FIG. 1, the bumper beam 14 may extend from a first end 28 to a second end 30 spaced from the first end 28. The bumper beam 14 may define a longitudinal axis L between the first end 28 and the second end 30 of the bumper beam 14. The longitudinal axis L may extend in a cross-vehicle direction, i.e., in a direction perpendicular to forward motion of the vehicle 10. In other words, the bumper beam 14 may be elongated in the cross-vehicle direction.

The bumper assembly 12 may include a plate 32, as shown in FIGS. 1-2 and 4A-5C. The plate 32 may be supported by the bumper beam 14. The plate 32 may be attached to the bumper beam 14 with a fastener, e.g., a bolt, a screw, a press-fit dowel, a weld, etc. The plate 32 may extend along the longitudinal axis L of the bumper beam 14 from a first end 34 to a second end 36. The first end 34 of the plate 32 may, for example, be adjacent to the first end 28 of the bumper beam 14, and the second end 36 of the plate 32 may, for example, be adjacent to the second end 30 of the bumper beam 14. In other words, the plate 32 may extend along the bumper beam 14 from the first end 28 of the bumper beam 14 to the second end 30 of the bumper beam 14. The plate 32 may be constructed of, e.g., a plastic, a metal, a composite, etc. The plate 32 may be constructed of the same material as one of the fin 16 and the secondary fin 22.

Figure 2:
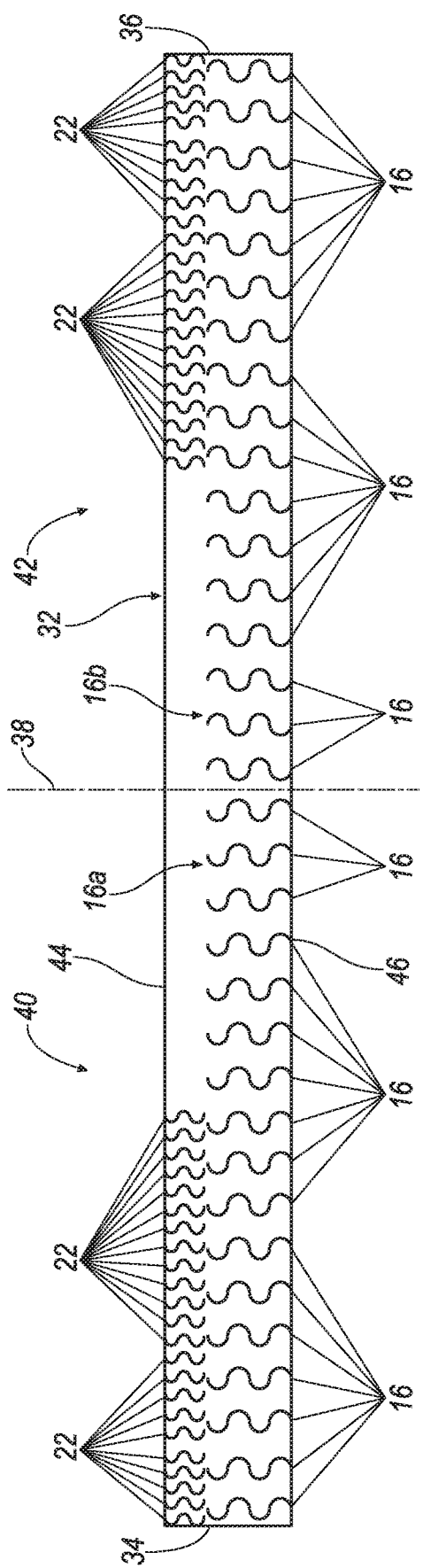
FIG. 2 is a front view of a plurality of fins and a plurality of secondary fins.

The plate 32 has a center 38, as shown in FIG. 2. The center 38 of the plate 32 may divide the plate 32 into a first side 40 and a second side 42. The center 38 may be disposed between the first end 34 of the plate 32 and the second end 36 of the plate 32. The center 38 may be disposed substantially halfway between the first end 34 of the plate 32 and the second end 36 of the plate 32. The first side 40 of the plate 32 may, for example, extend from the first end 34 of the plate 32 to the center 38 of the plate 32, and the second side 42 of the plate 32 may, for example, extend from the second end 36 of the plate 32 to the center 38 of the plate 32.

The plate 32 may include a top 44 and a bottom 46 spaced from the top 44 in a direction transverse to the longitudinal axis L, i.e., the cross-vehicle direction, as shown in FIG. 2. The top 44 and the bottom 46 may each extend from the first end 34 of the plate 32 to the second end 36 of the plate 32. In other words, the top 44 and the bottom 46 may each be elongated along the longitudinal axis L.

The bumper assembly 12 may include a fascia 48, as shown in FIG. 1. The fascia 48 may be supported by the bumper beam 14. For example, the fascia 48 may be attached to a body (not numbered) and/or to the bumper beam 14. The fascia 48 may be a portion of an exterior of the vehicle 10. In other words, the fascia 48 may cover the bumper beam 14. For example, the fascia 48 may extend along the bumper beam 14 from the first end 28 to the second end 30, i.e., along the longitudinal axis L. The fascia 48 may be spaced from the bumper beam 14, e.g., in a vehicle fore-and-aft direction. In other words, the fascia 48 and the bumper beam 14 may define a cavity 50 therebetween.

The fins 16 and secondary fins 22 may be disposed in the cavity 50, i.e., between the bumper beam 14 and the fascia 48, as shown in FIG. 1. The fins 16 and the secondary fins 22 may be supported by the plate 32 in the cavity 50. The fins 16 and the secondary fins 22 may each extend across the cavity 50, e.g., in the vehicle fore-and-aft direction, from the bumper beam 14 toward the fascia 48. The fins 16 extend farther across the cavity 50, e.g., in the vehicle fore-and-aft direction, then the secondary fins 22, as set forth further below.

The fins 16 each have a proximate end 18 and a distal end 20, as shown in FIGS. 1 and 4A-5C. Each fin 16 defines the axis A1 from the proximate end 18 to the distal end 20. In FIGS. 1 and 4A-5C, the axis A1 is shown for one of the fins 16, and the other fins 16 may extend along respective axes parallel to the axis A1. Alternatively, the fins 16 may not be parallel to each other, i.e., the respective axes may not be parallel to the axis A1. Each respective axis A1 extends from the respective proximate end 18 to the respective distal end 20. The proximate end 18 is proximate to the bumper beam 14, and the distal end 20 is distal to the bumper beam 14. The proximate end 18 may be attached to the plate 32. Alternatively, the proximate end 18 may be integral with the plate 32, i.e., formed as a unitary construction. The distal end 20 may receive the object during the first stage impact, as shown in FIGS. 4B and 5B. Thus, the distal end 20 may deform relative to the proximate end 18 during the impact.

Each fin 16 has a respective proximate end 18 and a respective distal end 20. Each fin 16 may extend from the proximate end 18 to the distal end 20 along the axis A1. Each proximate end 18 of each fin 16 may present a proximal flat surface 52. The proximal flat surfaces 52 may contact the plate 32. For example, the proximal flat surface 52 may be attached to the plate 32, e.g., with an adhesive, a braze, a weld, etc. Each distal end 20 of each fin 16 may present a distal flat surface 54. The distal flat surfaces 54 may receive the object during the first stage impact. The distal flat surfaces 54 may define a plane C, as shown in FIGS. 1 and 3.

Each fin 16 may have a plurality of segments 56, 58, 60 disposed along the axis A1 from the proximate end 18 to the distal end 20. For example, as shown in FIGS. 1, 3, and 4A-5C, each fin 16 may have a first segment 56, a second segment 58, and a third segment 60. The first segment 56 may be disposed adjacent to the proximate end 18, the third segment 60 may be disposed adjacent to the distal end 20, and the second segment 58 may be disposed between the first segment 56 and the third segment 60. The second segment 58 may be sandwiched between the first segment 56 and the third segment 60. In other words, the first segment 56 may extend from the proximate end 18 to the second segment 58, and the third segment 60 may extend from the distal end 20 to the second segment 58. The fin 16 may have any suitable number of segments 56, 58, 60.

Each segment 56, 58, 60 may extend any suitable amount along the axis A1. The segments 56, 58, 60 may, for example, extend different amounts along the axis A1. As one example, the first segment 56 and the second segment 58 may extend farther along the axis A1 than the third segment 60, as shown in FIGS. 1, 4A-5C. Also, the first segment 56 may extend farther along the axis A1 than the second segment 58, as shown in FIGS. 1, 4A-5C. As another example, the second segment 58 may extend farther along the axis A1 than the first segment 56. Alternatively, each of the segments 56, 58, 60 may extend the same amount along the axis A1.

Figure 3:
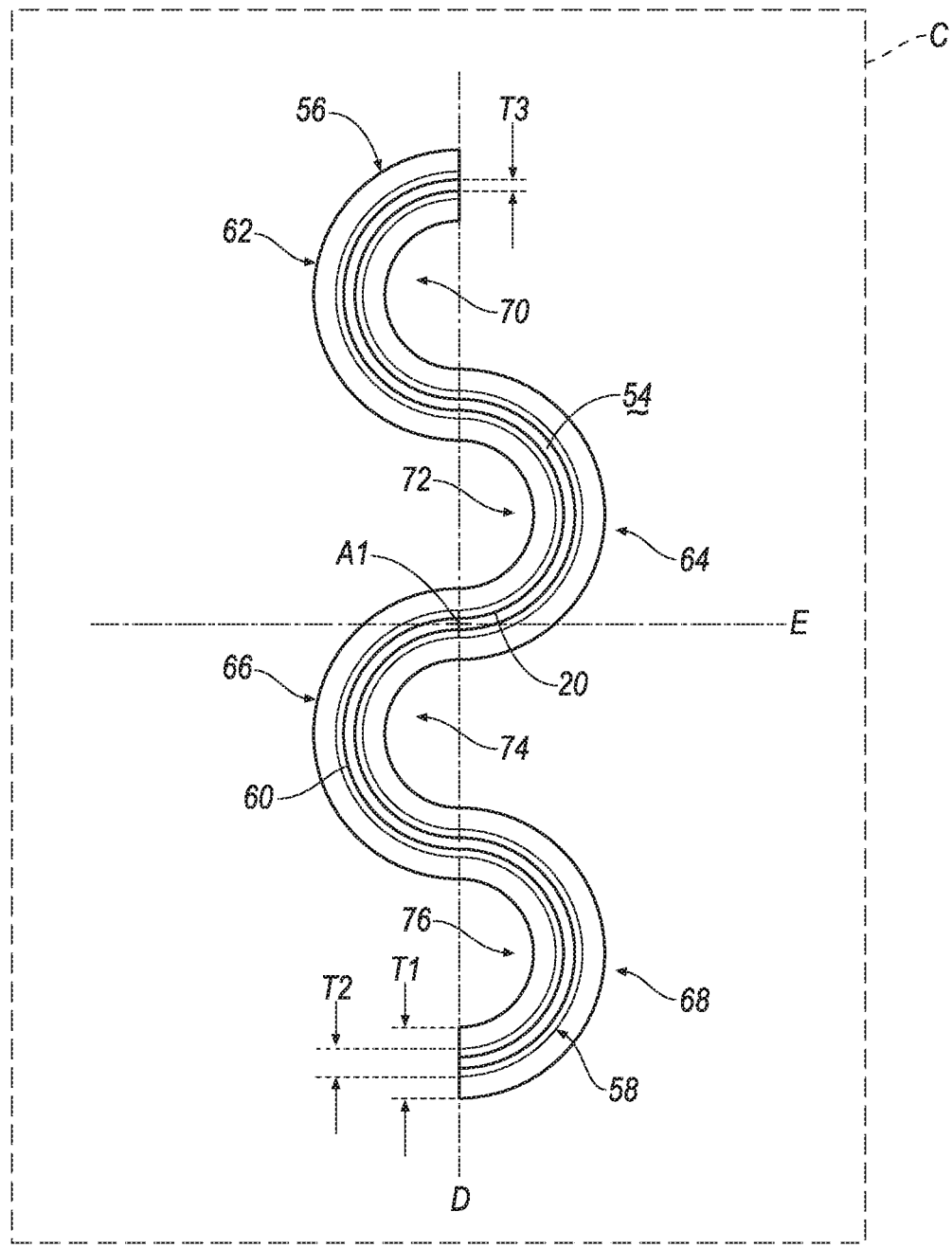
FIG. 3 is a front view of one of the plurality of fins.

With reference to FIG. 3, the thickness, i.e., material thickness, is taken in a plane normal to the axis A1. The thickness of each segment 56, 58, 60 decreases relatively along the axis A1 from the proximate end 18 to the distal end 20. In other words, the thickness of the fin 16 is greater in the first segment 56, i.e., adjacent to the proximate end 18, than in the third segment 60, i.e., adjacent to the distal end 20. For example, the first segment 56 may have a first thickness T1, the second segment 58 may have a second thickness T2, and the third segment 60 may have a third thickness T3. The first thickness T1 is greater than each of the second thickness T2 and the third thickness T3. Additionally, the second thickness T2 is greater than the third thickness T3. The fins 16 may include a transition between each of the segments 56, 58, 60. The transition may be rounded or angular.

The thickness of the fins 16 may be uniform along each segment 56, 58, 60. In other words, the thickness of each segment 56, 58, 60 may be constant along the axis A1. The thickness at each segment 56, 58, 60, i.e., the first thickness T1, the second thickness T2, and the third thickness T3, may be directly proportional to the stiffness of each segment 56, 58, 60. For example, the first segment 56 is stiffer than each of the second segment 58 and the third segment 60. Additionally, the second segment 58 is stiffer than the third segment 60. In other words, the stiffness of the fin 16 decreases along the axis A1 from the proximate end 18 to the distal end 20, i.e., from the first segment 56 to the third segment 60.

Each fin 16 has a cross section, as shown in FIG. 3. The cross section has a sinuous shape, i.e., serpentine, wavy, etc. The sinuous shape may be a repeating pattern of curves in opposite directions, i.e., in the shape of a sine wave. The cross section has a sinuous shape taken in a plane normal to the axis A1. The cross section may be sinuous from the proximate end 18 to the distal end 20, i.e., in any plane therebetween. For example, the cross section is sinuous in the plane C defined by the distal flat surfaces 54. That is, the axis A1 may be normal to the plane C. The sinuous shape may be substantially S-shaped. The sinuous cross section may provide deformation characteristics for the fin 16 that are similar to a closed cylindrical tube. Furthermore, the sinuous cross section may provide the tube-like deformation characteristics to a shape that is not a closed circle, e.g., the sinuous shape extending along the rectangular bumper beam 14. Thus, the fin 16 can provide specific deformation characteristics for various shapes of bumper assemblies.

With reference to FIG. 3, the sinuous shape includes a plurality of curves. For example, the sinuous shape may include a first curve 62, a second curve 64, a third curve 66, and a fourth curve 68. The first curve 62 defines a first opening 70, the second curve 64 defines a second opening 72, the third curve 66 defines a third opening 74, and the fourth curve 68 defines a fourth opening 76. Each of the curves may be substantially C-shaped.

With continued reference to FIG. 3, the sinuous shape may define a first center line D and a second center line E in the plane C. The sinuous shape may be symmetric about the second center line E. The first and third openings 70, 74 may oppose the second and fourth openings 72, 76 about the first center line D. The first and second openings 70, 72 may oppose the third and fourth openings 74, 76 about the second center line E. The sinuous shape may define a mirror image about the second center line E.

As shown in FIGS. 1-2 and 4A-5B, the fins 16 may be disposed adjacent to the bottom 46 of the plate 32. The fins 16 may be spaced from each other along the bumper beam 14. For example, the fins 16 may be spaced from each other along the longitudinal axis L of the bumper beam 14, i.e., in the cross-vehicle direction, from the first end 34 of the plate 32 to the second end 36 of the plate 32. The fins 16 may be spaced evenly along the bumper beam 14. Alternatively, the spacing between the fins 16 may vary.

The fins 16 may be spaced to provide specific deformation characteristics during the vehicle impact. A first fin 16a may be attached to the first side 40 of the plate 32, and a second fin 16b may be attached to a second side 42 of the plate 32, as shown in FIG. 2. Each fin 16 may have a fin orientation, i.e., a position of the fin 16 on the plate 32 about one or more of the axis A1, the first center line D, and the second center line E. The first fin 16a may have a different orientation than the second fin 16b, as shown in FIG. 2, e.g., the fin orientation of the first fin 16a may mirror the fin orientation of the second fin 16b. Alternatively, the first fin 16a may have a fin orientation transverse to a fin orientation of the second fin 16b.

The secondary fins 22 each have a proximate end 24 and a distal end 26, as shown in FIGS. 1 and 5A-5C. Each secondary fin 22 defines the axis A2 from the proximate end 24 to the distal end 26. In FIGS. 1 and 5A-5C, the axis A2 is shown for one of the secondary fins 22, and the other secondary fins 22 may extend along respective axes parallel to the axis A2. Alternatively, the secondary fins 22 may not be parallel to each other, i.e., the respective axes may not be parallel to the axis A2. The secondary fins 22 may extend parallel to the fins 16, i.e., the respective axes of the secondary fins 22 may be parallel to the respective axes of the fins 16. Alternatively, the secondary fins 22 may not be parallel with the fins 16. Each respective axis A2 extends from the respective proximate end 24 to the respective distal end 26.

The proximate end 24 is proximate to the bumper beam 14, and the distal end 26 is distal to the bumper beam 14. The proximate end 24 may be attached to the plate 32. Alternatively, the proximate end 24 may be integral with the plate 32, i.e., formed as a unitary construction. The distal end 26 may receive the object during the second stage impact, as shown in FIG. 5C. Thus, the distal end 26 may deform relative to the proximate end 24 during the second stage impact.

Each secondary fin 22 has a respective proximate end 24 and a respective distal end 26. Each secondary fin 22 may extend from the proximate end 24 to the distal end 26 along the axis A2. Each proximate end 24 of each secondary fin 22 may present a proximal flat surface 78. The proximal flat surfaces 78 may contact the plate 32. For example, the proximal flat surface 78 may be attached to the plate 32, e.g., with an adhesive, a braze, a weld, etc. Each distal end 26 of each secondary fin 22 may present a distal flat surface 80. The distal flat surfaces 80 may receive the object during the second stage impact. The distal flat surfaces 80 may define a second plane P, as shown in FIG. 1.

The second plane P is disposed between the plane C and the bumper beam 14, as shown in FIG. 1. In other words, the distal ends 26 of the secondary fins 22 are disposed between the bumper beam 14 and the distal ends 20 of the fins 16. The secondary fins 22, for example, are spaced from the fascia 48, and the fins 16, for example, may abut the fascia 48. Specifically, the distal ends 26 of the secondary fins 22 are spaced from the fascia 48, and the distal ends 20 of the fins 16 may abut the fascia 48. In other words, the secondary fins 22 extend partially across the cavity 50 from the bumper beam 14 toward the fascia 48, and the fins 16 may extend entirely across the cavity 50, e.g., from the bumper beam 14 to the fascia 48. Alternatively, the fins 16 may be spaced from the fascia 48. In other words, the distal ends 20 of the fins 16 may be spaced from the fascia 48. In this situation, the fins 16 extend partially across the cavity 50 toward the fascia 48 farther than the secondary fins 22.

Each secondary fin 22 may have a cross section in the second plane P, i.e., normal to the respective axis A2. The cross section of each secondary fin 22 may be any suitable shape, e.g., circular, rectangular, etc. The cross section of the secondary fin 22 may, for example, have a sinuous shape in a plane normal to the respective axis A2. The cross section may be sinuous from the proximate end 24 to the distal end 26, i.e., in any plane therebetween. In this situation, the cross section of the secondary fin 22 may be sinuous in the second plane P defined by the distal flat surfaces 80 of the secondary fins 22.

As shown in FIGS. 1 and 2, the secondary fins 22 may be disposed adjacent to the top 44 of the plate 32, i.e., the secondary fins 22 may be disposed above the fins 16. Alternatively, the fins 16 may be disposed adjacent to the top 44 of the plate 32, and the secondary fins 22 may be disposed adjacent to the bottom 46 of the plate 32. The secondary fins 22 may be spaced from each other along the longitudinal axis L of the bumper beam 14. The secondary fins 22 may, for example, extend from each end 34, 36 of the plate 32 toward the center 38 of the plate 32. As shown in FIG. 2, the secondary fins 22 extend along the longitudinal axis L from each end 34, 36 of the plate 32 to a position spaced from the center 38 of the plate 32, i.e., the secondary fins 22 may be spaced from the center 38 of the plate 32 along the longitudinal axis L. Alternatively, the secondary fins 22 may extend from each end 34, 36 of the plate 32 to the center 38 of the plate 32.

The secondary fins 22 may be spaced to provide specific deformation characteristics during the vehicle impact. The secondary fins 22 may have a same or different spacing as the fins 16 along the longitudinal axis L. For example, the secondary fins 22 may be closer together than the fins 16, as shown in FIG. 2. Each of the secondary fins 22 may have a fin orientation, i.e., a position of the secondary fin 22 on the plate 32. The secondary fins 22 disposed on the first side 40 of the plate 32 may have a different orientation than the secondary fins 22 disposed on the second side 42 of the plate 32. For example, the secondary fins 22 disposed on the first side 40 of the plate may have the same orientation as the first fin 16a, and the secondary fins 22 disposed on the second side 42 of the plate 32 may have the same orientation as the second fin 16b, as shown in FIG. 2, e.g., the fin orientation of the secondary fins 22 disposed on the first side 40 of the plate 32 may mirror the fin orientation of the secondary fins 22 disposed on the second side 42 of the plate 32. Alternatively, the secondary fins 22 disposed on the first side 40 of the plate 32 may have a fin orientation transverse to a fin orientation of the secondary fins 22 disposed on the second side 42 of the plate 32.

The secondary fins 22 are more resistive to deformation, i.e., stiffer, than the fins 16. The fins 16 and the secondary fins 22 may, for example, be constructed of a different material. As one example, the material of the fins 16 may have a higher ductility, i.e., a percentage of elongation, than the material of the secondary fins 22. In other words, the fins 16 may be formed of a softer material than the secondary fins 22. Alternatively, the secondary fins 22 may have a thickness, i.e., a width along the longitudinal axis L the same or greater than the thickness of the first segment 56 of the fins 16. In other words, the secondary fins 22 may be at least as stiff as the first segment 56 of the fins 16, i.e., stiffer than the second segment 58 and the third segment 60. The fins 16 and the secondary fins 22 may be constructed of any suitable material, e.g., a polymer, a plastic, a thermoplastic, a metal, a composite, etc.

The bumper assembly 12 may absorb energy during a high-speed impact test. The high-speed impact test may be a high-speed pedestrian impact test, e.g., a European New Car Assessment Program (EURO NCAP) Pedestrian Testing Protocol Version 8.4 (November 2017), that simulates an impact between a pedestrian's leg and the vehicle 10. The test uses a legform 82, which is a test device including a plurality of sensors (not shown) designed to simulate a human leg. In the high-speed pedestrian impact test, the legform 82 is attached to a launcher (not shown), e.g., an air, spring, or hydraulic gun, in front of the vehicle 10. The launcher propels the legform 82 toward the vehicle 10 and into the bumper assembly 12. The launcher is positioned to propel the legform 82 at a specific angle relative to the axis A1, e.g., 0 degrees to simulate a front impact. The launcher propels the legform 82 to the bumper assembly 12 such that the legform 82 moves at 11.11 meters per second (40 kilometers per hour) upon contacting the bumper assembly 12. A computer (not shown) collects data from the sensors in the legform 82 on the forces and moments applied to different parts of the legform 82, e.g., parts representing an upper femur, a lower tibia, a knee, a position above the knee (e.g. 40 mm), and a position below the knee (e.g., 40 mm).

Figure 4A:
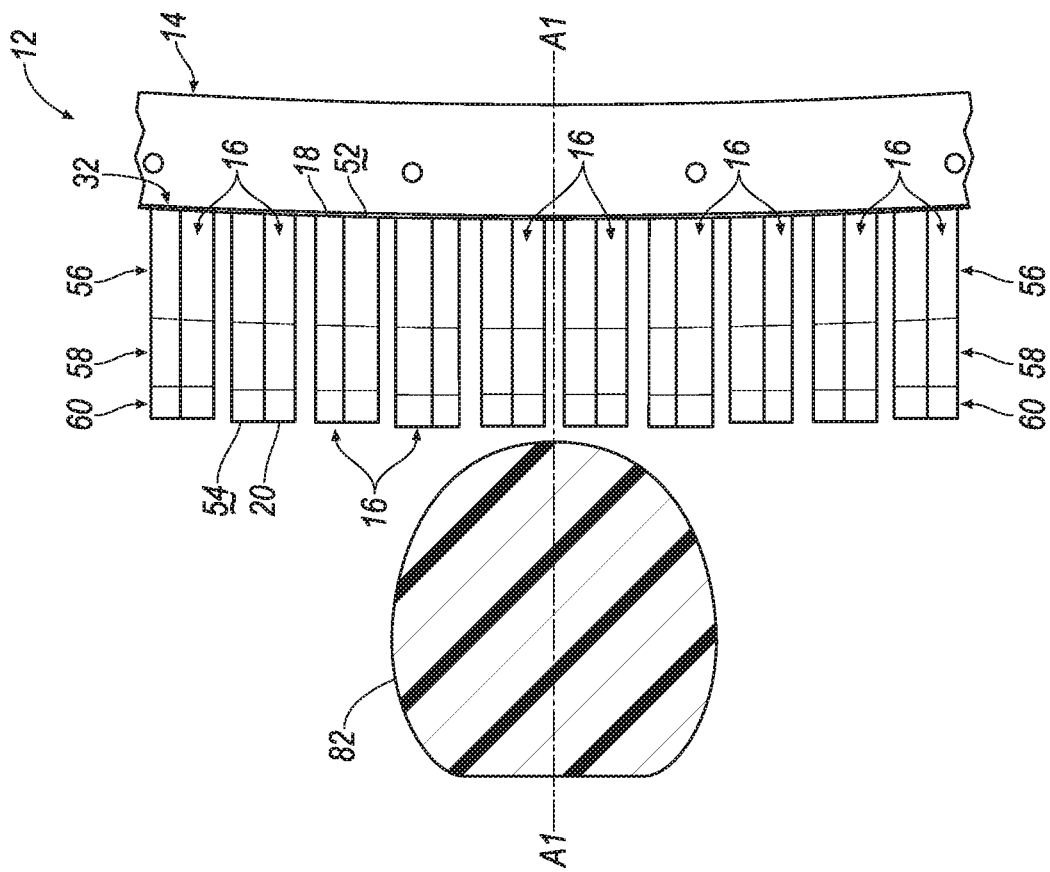

FIGS. 4A-4B show the legform 82 impacting the vehicle 10 in a high-speed pedestrian impact test. FIG. 4A shows the legform 82 prior to impacting the bumper assembly 12, and FIG. 4B shows the legform 82 upon impacting the bumper assembly 12 in the first stage impact. Upon impact, the legform 82 engages one or more fins 16, deforming the distal ends 20 of the fins 16 toward the plate 32. Because the thickness at the distal end 20 is less than the thickness at the proximate end 18, i.e., the fin 16 is stiffer at the proximate end 18 than the distal end 20, the fin 16 may axially deform, e.g., bend, crush, etc., absorbing energy from the legform 82 and reducing acceleration of the legform 82 during impact. Furthermore, in the impact shown in FIGS. 4A-4B, only a few of the plurality of fins 16 receive the legform 82, providing a controlled deceleration and controlled movement of the legform 82 as the fins 16 deform and absorb energy from the legform 82. Thus, the impulse from the impact is spread over a longer time during the impact, reducing impact energy transmitted to the legform 82. In this situation, the fins 16 may prevent intrusion of the legform 82 to the secondary fins 22. In other words, the fins 16 may absorb the energy of the legform 82 such that the legform 82 remains spaced from the secondary fins 22.

The bumper assembly 12 may absorb energy during a low speed vehicle impact test. The low speed vehicle impact test may be an RCAR low speed damageability test or an Insurance Institute for Highway Safety (IIHS) bumper test. The test uses an impact barrier 84 that simulates an end of another vehicle. The impact barrier 84 may be a rigid object with an energy absorber designed to simulate a bumper on another vehicle. The vehicle 10 moves toward the impact barrier 84 at a specified speed, e.g., 15-16 kilometers per hour, such that the bumper assembly 12 impacts the impact barrier 84. Upon impacting the impact barrier 84, the vehicle 10 decelerates. Images of the bumper assembly 12 are collected to measure the deformation of the bumper assembly 12, e.g., the deformation of the fins 16.

Figure 5A:
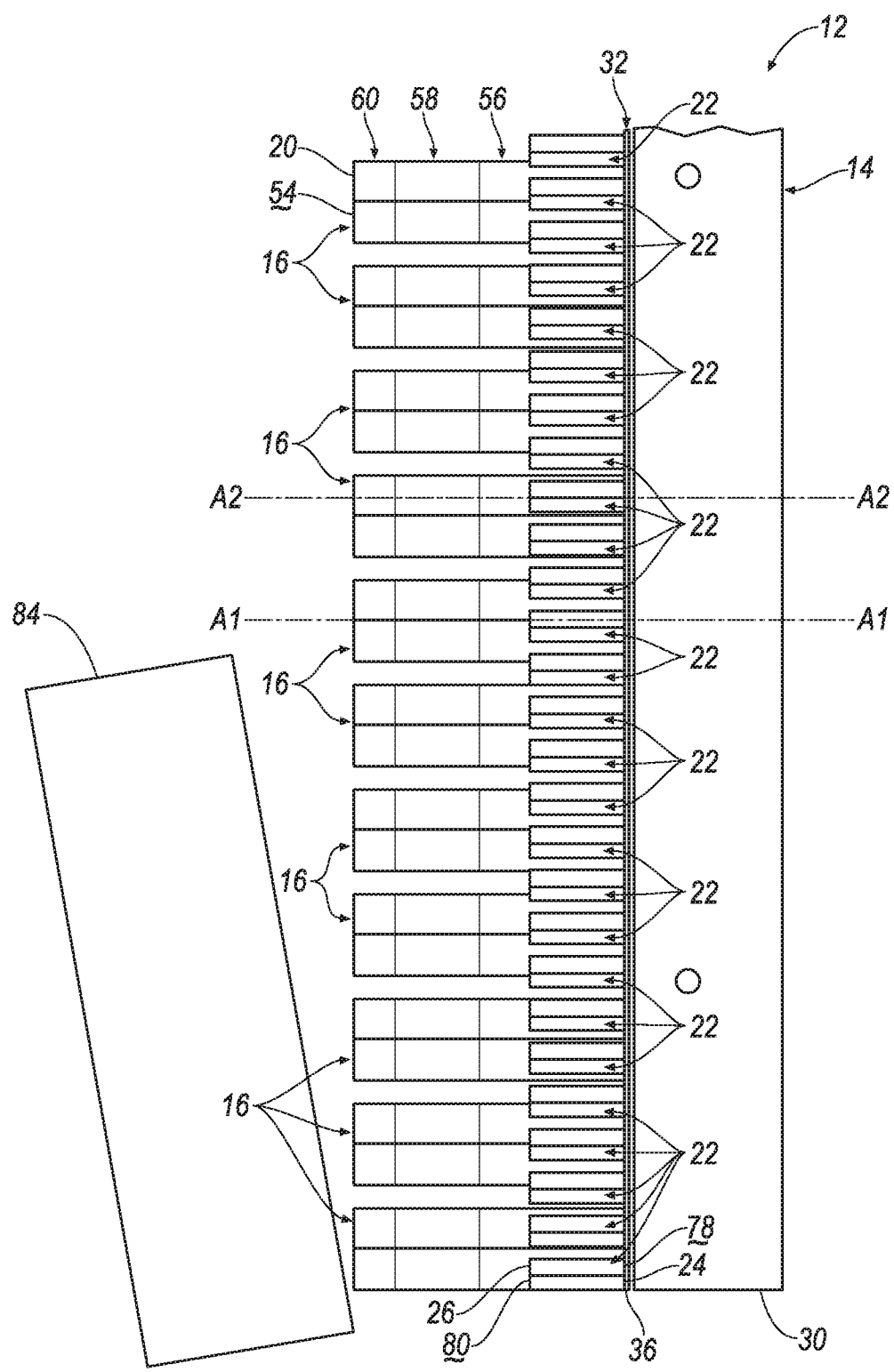
FIGS. 5A-5C illustrate the bumper assembly impacting another object.
Figure 5B:
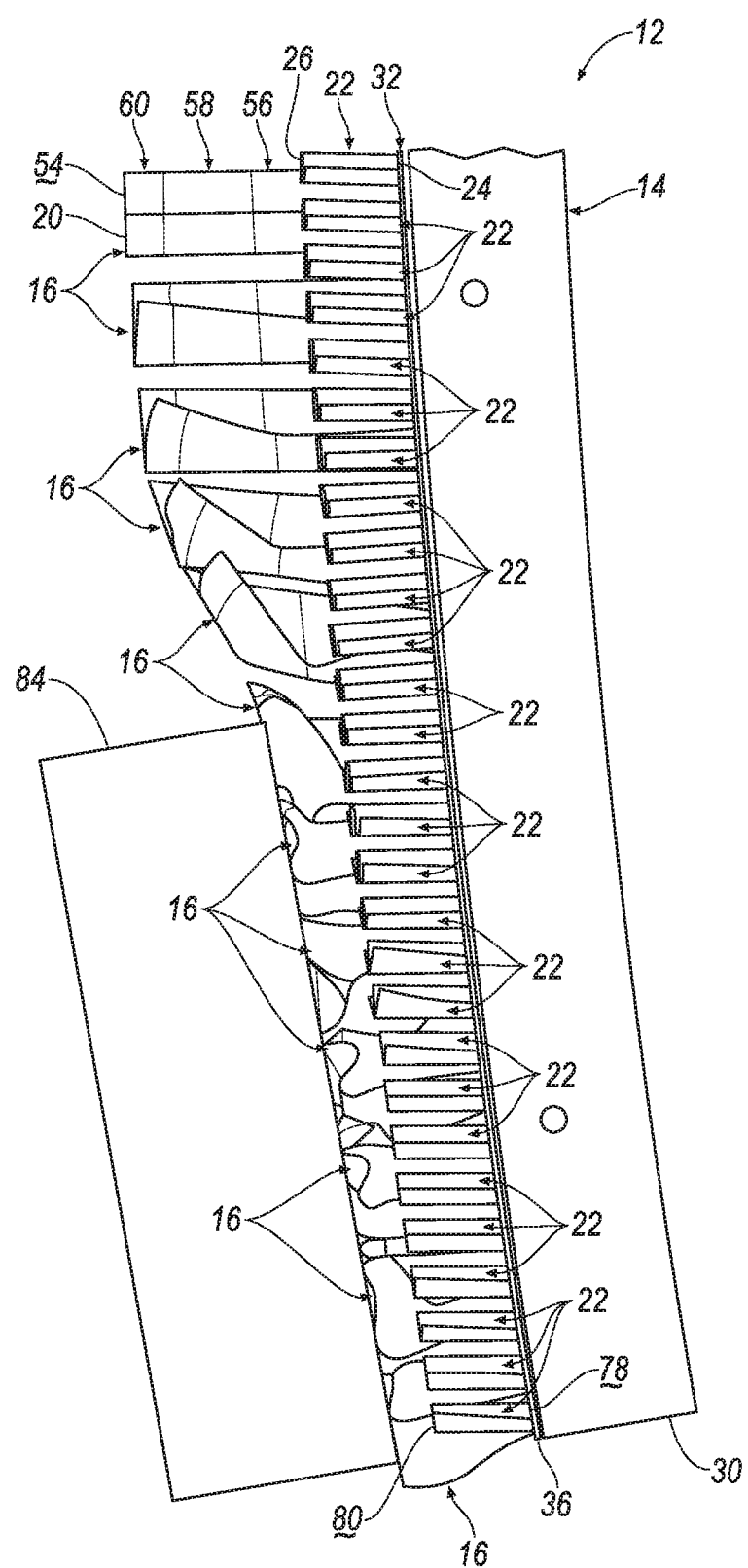
Figure 5C:
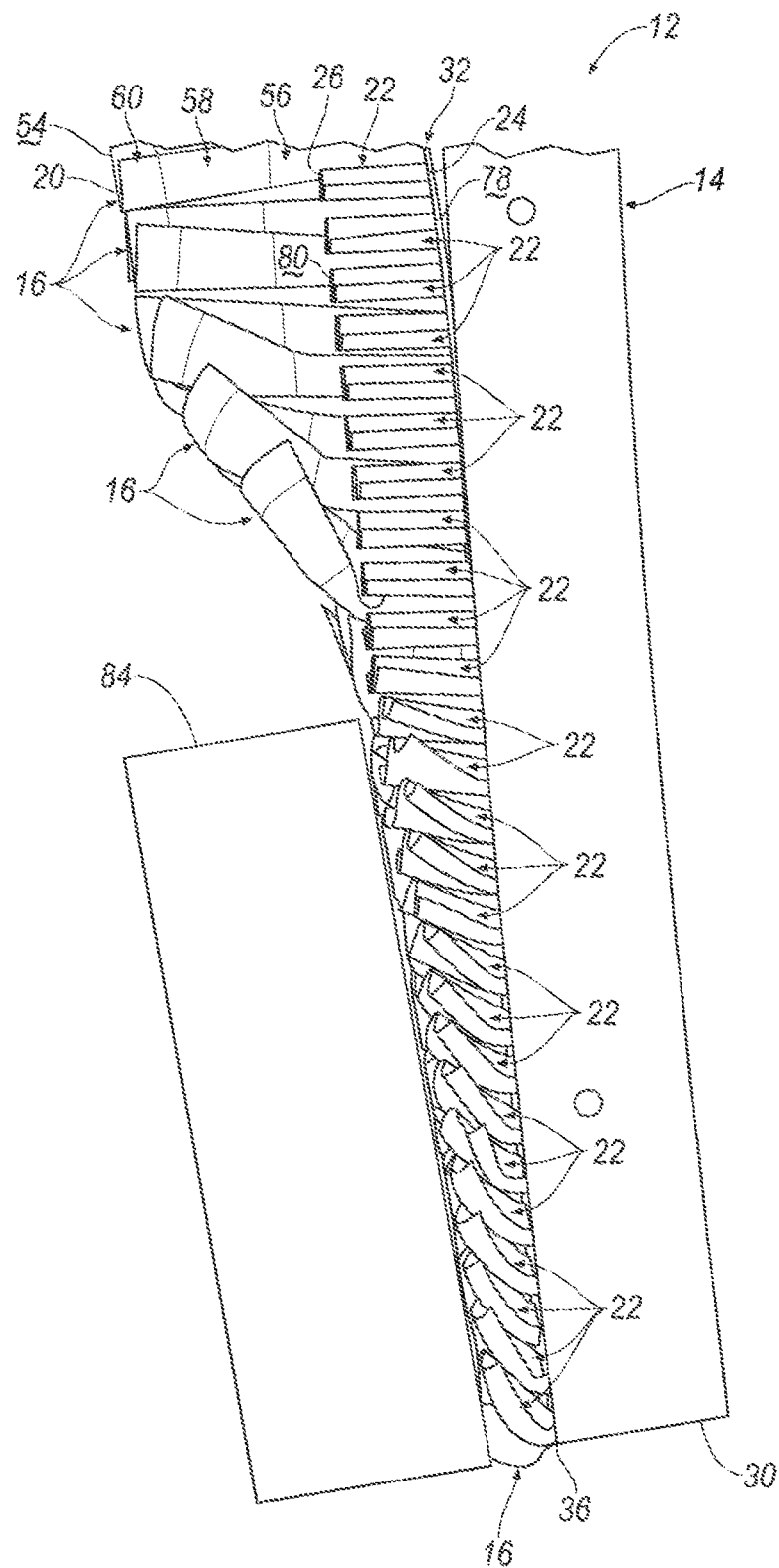

FIGS. 5A-5C show the impact barrier 84 impacting the vehicle 10 in a low speed damageability test. FIG. 5A shows the impact barrier 84 prior to impacting the bumper assembly 12, FIG. 5B shows the impact barrier 84 upon impacting the fins 16 in the first stage impact, and FIG. 5C shows the impact barrier 84 upon impacting the secondary fins 22 in the second stage impact. During the first stage, the impact barrier 84 may engage the distal ends 20 of the fins 16. In this situation, most or all of the plurality of fins 16 may engage the impact barrier 84, distributing the impact load and reducing the force on each individual fin 16. The fins 16 absorb energy from the impact barrier 84 while reducing the deformation in each individual fin 16. Thus, the fins 16 reduce intrusion of any specific part of the impact barrier 84 to the vehicle 10, improving low speed damageability. The impulse from the first stage impact is spread over a longer time during the impact, reducing impact energy transmitted to the impact barrier 84.

During the second stage, the impact barrier 84 may impact the distal ends 26 of the secondary fins 22. In other words, the impact barrier 84 may have deformed the fins 16, i.e., one or more segments 56, 58, 60, in the first stage impact and continued to intrude toward the bumper beam 14. In this situation, most or all of the plurality of secondary fins 22 may engage the impact barrier 84, distributing the impact load and reducing the force on each individual secondary fin 22. The secondary fins 22 absorb energy from the impact barrier 84 while reducing the deformation of each individual secondary fin 22. Thus, the secondary fins 22 reduce intrusion of any specific part of the impact barrier 84 to the vehicle 10. Furthermore, the secondary fins 22 prevent the impact barrier 84 from impacting the bumper beam 14, i.e., bottoming out against the bumper beam 14, improving low speed damageability. The impulse from the second stage impact is spread over a longer time during the impact, reducing impact energy transmitted to the impact barrier 84.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly, comprising:
   a bumper beam; and
   a fin and a secondary fin each supported by the bumper beam and extending along an axis from a proximate end proximate to the bumper beam to a distal end distal to the bumper beam;
   the fin having a sinuous cross section and a thickness both taken in a plane normal to the axis, the thickness at the distal end being less than the thickness at the proximate end;
   wherein the distal end of the secondary fin is disposed between the bumper beam and the distal end of the fin.

2. The bumper assembly of claim 1, wherein the fin includes a plurality of segments disposed along the axis from the proximate end to the distal end, the thickness of each segment decreases relatively along the axis from the proximate end to the distal end.

3. The bumper assembly of claim 1, further comprising:
   a plurality of fins, the plurality of fins including the fin, each of the plurality of fins being supported by the bumper beam and each extending along an axis from a proximate end proximate to the bumper beam to a distal end distal to the bumper beam, wherein each fin has a sinuous cross section normal to the respective axis and a thickness, the thickness at the distal end is less than the thickness at the proximate end; and a plurality of secondary fins, the plurality of secondary fins including the secondary fin, each of the plurality of secondary fins having a sinuous cross section, and each of the secondary fins being stiffer than the fins.

4. The bumper assembly of claim 3, wherein each of the fins includes a plurality of segments disposed along the axis from the proximate end to the distal end, the thickness of each segment decreases relatively along the axis from the proximate end to the distal end.

5. The bumper assembly of claim 3, wherein the fins are spaced along the bumper beam in a cross-vehicle direction.

6. The bumper assembly of claim 3, further comprising a plate supported by the bumper beam, wherein the fins are supported by the plate.

7. The bumper assembly of claim 6, wherein the plate extends in a cross-vehicle direction from a first end to a second end and includes a center between the first and second ends, the fins include a first fin attached to the plate between the first end and the center and a second fin attached to the plate between the center and the second end, the first fin has a different orientation that the second fin.

8. The bumper assembly of claim 1, further comprising a fascia,
wherein the fin is disposed between the bumper beam and the fascia.

9. A bumper assembly, comprising:
a bumper beam;
a fin and a secondary fin each supported by the bumper beam and extending along an axis from a proximate end to a distal end;
wherein the fin has a sinuous cross section normal to the respective axis, and the distal end of the secondary fin is disposed between the bumper beam and the distal end of the fin.

10. The bumper assembly of claim 9, wherein the secondary fin has a sinuous cross section.

11. The bumper assembly of claim 9, wherein the secondary fin is stiffer than the fin.

12. The bumper assembly of claim 9, wherein the fin has a plurality of segments disposed along the axis from the proximate end to the distal end, the thickness of each segment decreases relatively along the axis from the proximate end to the distal end.

13. The bumper assembly of claim 9, further comprising a plurality of fins, the plurality of fins including the fin, each of the plurality of fins being supported by the bumper beam and each extending along an axis from a proximate end to a distal end, wherein each fin has a sinuous cross section normal to the respective axis, and wherein each fin has a plurality of segments disposed along the respective axis from the respective proximate end to the respective distal end, the thickness of each segment decreases relatively along the respective axis from the respective proximate end to the respective distal end.

14. The bumper assembly of claim 13, further comprising a plurality of secondary fins, the plurality of secondary fins including the secondary fin, each of the plurality of secondary fins being supported by the bumper beam and each extending along an axis from a proximate end to a distal end, wherein the distal ends of the secondary fins are disposed between the bumper beam and the distal ends of the fins.

15. The bumper assembly of claim 14, wherein the distal ends of the fins each present a flat surface, the flat surfaces of the fins defining a plane, and each fin has a sinuous cross section in the plane.

16. The bumper assembly of claim 15, wherein the distal ends of the secondary fins each present a flat surface, the flat surfaces of the secondary fins defining a second plane parallel to the plane.

17. The bumper assembly of claim 16, wherein each secondary fin has a sinuous cross section in the second plane.

18. The bumper assembly of claim 9, further comprising a plate supported by the bumper beam, wherein the fin and the secondary fin are supported by the plate.

19. The bumper assembly of claim 18, wherein the plate extends from a top to a bottom in a direction transverse to a cross-vehicle direction, and wherein the fin is disposed adjacent to one of the top and the bottom of the plate and the secondary fin is disposed adjacent to the other of the top and the bottom of the plate.

20. The bumper assembly of claim 9, further comprising a fascia, wherein the fascia covers the fin and the secondary fin.

* * * * *